(12) United States Patent
Griessbach

(10) Patent No.: US 6,323,764 B1
(45) Date of Patent: Nov. 27, 2001

(54) DATA BUS FOR VEHICLES WITH MULTIPLE PASSENGER SAFETY DEVICES

(75) Inventor: Robert Griessbach, Weyarn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/254,484

(22) PCT Filed: Aug. 27, 1997

(86) PCT No.: PCT/EP97/04671

§ 371 Date: Dec. 9, 1999

§ 102(e) Date: Dec. 9, 1999

(87) PCT Pub. No.: WO98/09844

PCT Pub. Date: Mar. 12, 1998

(30) Foreign Application Priority Data

Sep. 7, 1996 (DE) ............................................. 196 36 442

(51) Int. Cl.[7] ...................................................... B60Q 1/00
(52) U.S. Cl. ...................... 340/438; 340/425.5; 340/428; 340/825.5
(58) Field of Search ...................................... 340/428, 438, 340/463, 468, 825.14, 825.2, 825.5, 825.51, 425.5; 370/462, 475; 359/118, 136, 137

(56) References Cited

U.S. PATENT DOCUMENTS

| | | | |
|---|---|---|---|
| 4,365,294 | * | 12/1982 | Stocken ................................ 713/502 |
| 4,715,031 | * | 12/1987 | Crawford et al. ................ 340/825.5 |
| 4,809,257 | * | 2/1989 | Gantenbein et al. ................ 359/136 |

FOREIGN PATENT DOCUMENTS

| | | |
|---|---|---|
| 0 216 372 | 4/1987 | (DE) . |
| WO 88/05390 | 7/1988 | (DE) . |
| WO 89/09146 | 10/1989 | (DE) . |
| WO 95/15043 | 6/1995 | (DE) . |

OTHER PUBLICATIONS

"Mehrpunktschaltungen in ISDN–Kommunikations–Systemen", Peter Schulthess and Konrad Froitzheim; ntz Bd. 41, (1988) Heft 9, pp. 500–503.

* cited by examiner

*Primary Examiner*—Van T. Trieu
(74) *Attorney, Agent, or Firm*—Crowell & Moring LLP

(57) ABSTRACT

In a data bus for vehicles with multiple passenger safety devices which share the data bus, each bus sharing device possesses a hierarchical transmission token. The transmission token is valid at a moment in time measured by the time elapsed since an initialization time, and is dependent upon a transmission operation by the bus-sharing device which precedes it in the hierarchy.

13 Claims, 3 Drawing Sheets

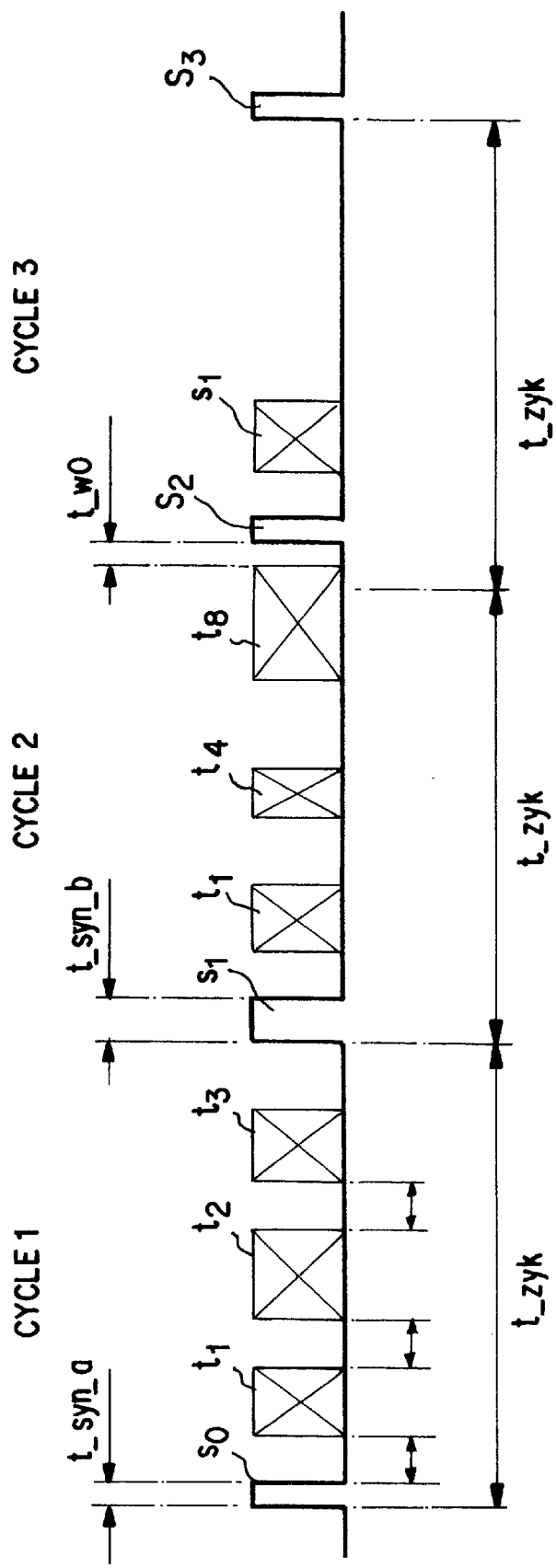

DATA BUS FOR VEHICLES WITH MULTIPLE PASSENGER SAFETY DEVICES

BACKGROUND AND SUMMARY OF THE INVENTION

The invention relates to a data bus for vehicles having several safety related devices which constitute "subscribers" of the data bus.

Such devices include actuators such as airbags and belt tighteners, or also sensors which provide information regarding safety conditions and vehicle measurements. The data bus according to the invention differs in significance and function from known data buses which are common in motor vehicles, and which permit data exchange among all subscribers. Such subscribers include vehicle subsystems such as, for example, engine electronics, electronic hydraulic transmission control and an antilock system, which operate satisfactorily only if there is an exchange of data between all subscribers.

In a data bus for safety systems, in addition to the transit time and the time intervals between the recognition of a situation critical to safety and the reaction thereto (for example, the activation of an airbag), the main problem is to permit at least those subscribers which are important in a critical safety situation to have rapid access to the data bus. International patent document WO 89/09146 A discloses a controlled access method which requires hierarchical control for subscriber access to the data bus. Each subscriber has a time window which, according to its hierarchy, precedes or follows the subscribers arriving after or ahead of it. Each subscriber must wait until the time window of hierarchically preceding subscribers has expired, regardless of whether these subscribers are actually transmitting. In safety-critical systems, this requirement signifies a possibly unacceptable loss of time. On the one hand, the access of all subscribers to the data bus must be assured, and on the other hand, each subscriber must wait until the time windows of preceding subscribers have expired.

Alternative random access methods for the application as mentioned are also problematic, since several subscribers can transmit simultaneously (i.e., within the duration of the signal transit time), and therefore interference can occur. To avoid this problem, it is known to provide special systems for recognizing potential interference. However, the detectors used for this purpose increase costs and in the case of an interference require the establishment of retry time intervals, which likewise involves time delays. Hence the danger that a safety device (such as an airbag, for example) will not be deployed quickly enough when needed.

It is an object of the invention to provide a device which permits a plurality of subscribers to rapidly access a data bus which is connected to systems critical for ensuring passenger safety, without any interference.

This and other objects and advantages are achieved by the data bus according to the invention, in which each subscriber has a hierarchical transmission right, and each subscriber transmits only during an alarm situation. The right to transmit is obtained only at a point in time which is measured from an initialization point, and depends on its position within the hierarchy as well as the duration of transmission of the subscribers preceding it in the hierarchy. The time interval between two successive initialization points in time is selected such that the subscribers which must transmit during a critical condition can all and completely access the bus, while other subscribers can access the bus as transmitters only in the absence of a condition which is critical to passenger safety.

Each subscriber has a defined point in time for the beginning of its right to transmit. This depends, on the one hand, upon its hierarchical position, and on the other hand upon whether one or more hierarchically preceding subscribers are transmitting. If none of the priority subscribers is transmitting, it receives its right to transmit at the earliest possible point in time. If subscribers having a higher priority are transmitting, the point in time of its right to transmit shifts according to the number and length of the messages emanating from these subscribers.

The transmitting operation of the subscribers can be controlled via a cycling pulse which serves as an initialization pulse. By setting the cycling frequency (i.e., the frequency with which this pulse is emitted), the maximum time which passes from the occurrence of a critical safety situation until the particular subscriber accesses the data bus can be established. When necessitated, in order to activate (as quickly as possible) devices which are critical to passenger safety, it may be advantageous to shorten the cycling time (at that instant or with respect to the maximum time necessary for the emission of messages from all subscribers). As a result, it is no longer possible for all subscribers to access the data bus. Instead, it is advantageous to limit the number of subscribers to those which (in a situation critical to passenger safety) must absolutely have access to the data bus, while the other subscribers can in that case no longer access the data bus.

Simultaneously, or in addition, the shortening of the cycling time (in the manner described) can also raise the problem that a subscriber may still be transmitting after the end of the cycling time. Here, it may be advantageous to lengthen the cycling time accordingly and synchronize the following transmission of the initialization pulse with the second-to-last initialization pulse.

By means of the initialization pulse, it is possible to distinguish a critical state (alarm case) from a noncritical normal state (normal case). For this purpose, it can be advantageous to provide different lengths of the initialization pulse for the two conditions. The subscribers will then be shifted by the initialization pulse (more or less) to the alarm state.

The method according to the invention can be used to special advantage with a data bus based on a light waveguide. Such data buses require that the transmission operation of the subscribers be performed with high power, in order to compensate for the high power losses occurring in light waveguides, and to enable them to receive the transmitted message free from disturbances (in the case of subscribers which are at remote locations of the data bus).

Other objects, advantages and novel features of the present invention will become apparent from the following detailed description of the invention when considered in conjunction with the accompanying drawings.

BRIEF DESCRIPTION OF THE DRAWINGS

FIG. 3 is a diagram for explaining how the bus system operates.

DETAILED DESCRIPTION OF THE DRAWINGS

Figure 1:
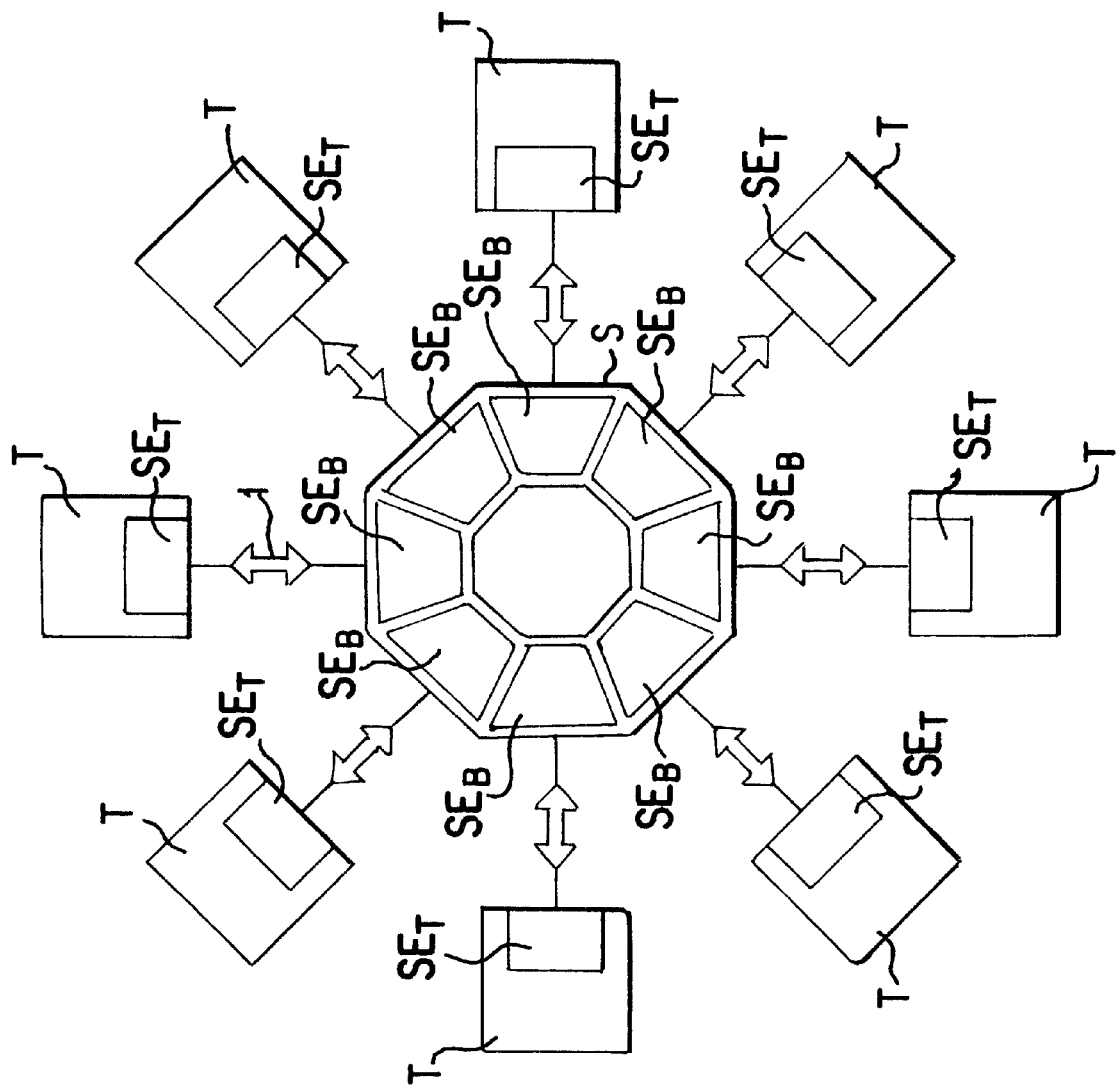
FIG. 1 shows the basic structure of the bus system.

The bus system shown in FIG. 1 contains several subscribers T which are connected to one another by a light waveguide 1 and an active star coupler S. A send-receive module $S-E_T$ is present for switching onto the bus system, and a send-receive diode (not shown) as well as a beam splitter optic are integrated therein. The S-$E_T$ modules are connected via corresponding S-$E_B$ modules to the light waveguide. The S-$E_B$ modules form an active star coupler, and are connected such that a message emitted by a subscriber is distributed to all other strands of the bus system. Furthermore, the function of the bus master is performed by a subscriber $T_M$.

The messages entering the bus from a particular subscriber and transmitted to the other subscribers identify states or values measured by sensors as a part of the subscriber. Also, actuators such as airbags and seat-belt tighteners are connected to the bus system. The actuators detect the messages delivered by the sensors and compute the necessary actions (individually). At the same time, a potentially critical condition in a subscriber is recognized by the bus master, and answered by issuing onto the bus an initialization pulse which differs in length from any initialization pulse otherwise issued by the bus master.

Figure 2:
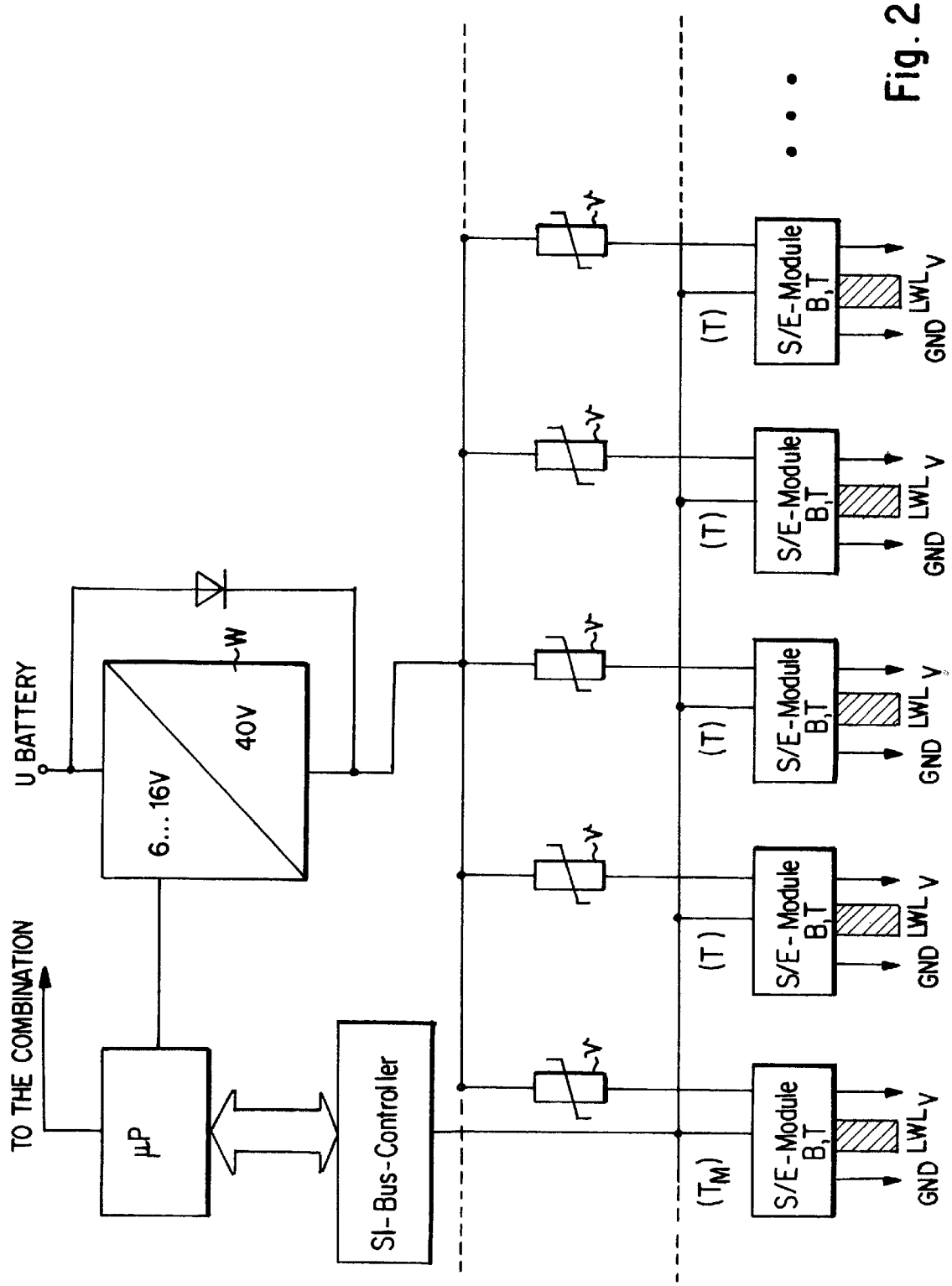
FIG. 2 shows a section of the bus system of FIG. 1.

The basic structure of the active star coupler S is explained with the aid of FIG. 2, wherein a section of the star coupler is represented. The function of the bus master is integrated into the star coupler (as previously mentioned). The bus master $T_M$ transmits synchronization pulses cyclically. The time spacing of these pulses is selected such that the subscribers which necessarily transmit during a critical condition can all fully access the bus during a synchronization cycle, while other subscribers (including the actuators, for example) can access the bus as transmitters only in the absence of a condition which is critical to passenger safety.

The bus master $T_M$ continually monitors the data bus and recognizes the presence of a safety-critical condition. It then automatically transmits a synchronization pulse which differs in length from the regular synchronization pulse. The subscribers of the bus system thus receive additional information regarding a critical state which (during proper operation) they themselves otherwise recognize on the basis of a message present on the data bus. In case of failure of the master function, another bus subscriber can be designated to assume the master function, and determine the alarm state.

The data traffic on the data bus is explained with the aid of FIG. 3. The bus master $T_M$ emits a synchronization pulse $s_y$ at regular time intervals. Shown in FIG. 3 is a total of four pulses $s_0$, $s_1$, $s_2$ and $s_3$. The subscribers are given the right to transmit with a given transmit priority. If a particular subscriber is in a noncritical safety state it does not transmit, as a rule. ("As a rule" in this case connotes simply that the initialization process is not involved, in which the subscribers—after the vehicle is started or at regular intervals—emit an identification to the other subscribers and bus master. These intervals are a multiple of the synchronization cycle.)

If a noncritical condition is involved, i.e., the subscribers are not all transmitting, the next synchronization pulse is emitted by the bus master at the end of the cycle time $t_{zyk}$.

In the event of a condition critical to passenger safety (in which, for example, the bus subscriber is activated with the highest transmit priority), the data bus is first occupied with its message $t_1$. This message is transmitted at a moment $t_{wx}$ after the synchronization pulse (here, $t_0$) which results from the physical conditions of a light waveguide data bus. The subscriber with the transmit priority next following then likewise transmits, for example, and issues the message $t_2$. The same applies accordingly for the subscriber with the telegram $t_3$.

As disclosed in German patent document DE 34 35 216 A, each message $t_1$ has an identification on the basis of which the other subscribers identify the message, and can receive it in a given case. It is also possible to put messages on the data bus which contain the address of a receiver and are intended only for that receiver. At the end of the period, and if at this moment no subscriber is transmitting, the next synchronization pulse $s_y$ is sent (here at the time $t_1$).

If, however, a subscriber (here subscriber $T_8$) transmits at the end of the cycle, the emission of the synchronization pulse is delayed. This case is represented in the period marked "Cycle 2." The delay $t_{w0}$ must then be smaller than the time span $t_{wx}$ which exists between the transmissions of successive subscribers, in order to make it possible to issue the synchronization pulse before the next data message.

The next synchronization pulse $s_3$ is synchronized with the first synchronization pulse $s_0$ emitted at the start of Cycle 1. The time interval between the synchronization pulse $s_2$ and $s_3$ is less than the cycle time.

Additional properties of the data bus are also represented in FIG. 3. In Cycle 2, the subscribers $T_1$, $T_4$ and $T_8$ are assumed to be active transmitters. The transmission time point is measured from the end of the transmission of the hierarchically preceding subscriber and the actual hierarchical position. In the event of successive hierarchical positions of two transmitters, the time interval is minimal and equal to $t_{wx}$. The time interval of two transmitters increases with their hierarchical interval. Therefore the interval between $t_1$ and $t_4$ is greater than the interval between $t_1$ and $t_2$, and less than the interval between $t_4$ and $t_8$. In this manner, each subscriber has the possibility of transmitting when necessary, provided its right to transmit is within the cycle time. Otherwise, it transmits only during an actual emergency. Nevertheless, the transmission time point is precisely established, interferences are thereby prevented, and the transmission time point of each subscriber is the earliest possible. During an alarm, the length of the synchronization pulse is increased. Thus, as previously explained, protection against erroneous activation of a safety system is achieved.

In this manner, for the first time, the possibility for devices responsible for motor vehicle users to have data communicated through a data bus is created. Furthermore, in this data bus, the possibility exists for its access by subscribers which are associated with systems not critical to passenger safety in a non-emergency situation. These devices can be located, for example, in a vehicle door and used to operate the window, the outside mirror or to heat the door lock. All that is required is a priority that is lower than that of the safety-critical systems, in order not to interfere with their operation during an emergency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system for a vehicle having multiple devices for performing respective functions related to safety or operation of the vehicle, said system comprising:
   a data bus; and
   a plurality of subscribers coupled to the data bus, each subscriber being associated with a respective one of said devices;
   wherein
   each subscriber has a hierarchical transmission priority, based on an established transmission hierarchy;

at least selected subscribers transmit only during an alarm condition;

each particular subscriber obtains a transmission right only at a moment in time which is measured from a moment of initialization, in accord with the hierarchical transmission priority of said particular subscriber and a duration of transmission of preceding subscribers in the transmission hierarchy; and a time interval between successive moments of initialization is selected such that subscribers which transmit during a critical condition can all completely access the data bus, while other subscribers can access the bus as transmitters only when a condition critical to passenger safety is absent.

2. Data bus according to claim 1, wherein the subscribers emit a condition signal during a normal situation.

3. Data bus according to claim 2, wherein the moment of initialization is determined by a cyclically emitted initialization pulse.

4. Data bus according to claim 2, wherein a next occurring initialization pulse is emitted with a delay when a subscriber is transmitting at the end of a cycle time.

5. Data bus according to claim 4, wherein an initialization pulse following sequentially after the next occurring initialization pulse is synchronous with a first initialization pulse.

6. Data bus according to claim 5, wherein an initialization pulse during the alarm condition possesses a length which is different from an initialization pulse during a normal condition.

7. Data bus according to claim 4, wherein an initialization pulse during the alarm condition possesses a length which is different from an initialization pulse during a normal condition.

8. Data bus according to claim 1, wherein the moment of initialization is determined by a cyclically emitted initialization pulse.

9. Data bus according to claim 8, wherein an initialization pulse during the alarm condition possesses a length which is different from an initialization pulse during a normal condition.

10. Data bus according to claim 1, wherein during a normal condition subscribers associated with devices of the vehicle which are not critical to passenger safety occupy the data bus.

11. A method for controlling communication in a vehicle via a data bus having a plurality of data bus subscribers each of which subscribers performs a function related to safety or operation of the vehicle, and at least some of which subscribers transmit data only when their function is relevant to an existing safety critical condition, said method comprising:

assigning to each subscriber a communication priority according to a communication hierarchy based on safety of the vehicle;

allocating to each subscriber a transmission right for commencement of transmission at a variable point in time measured from an initialization point, dependent on a communication priority of such subscriber and dependent upon whether or not hierarchically preceding subscribers transmit data.

12. A method according to claim 11, wherein said point in time for commencement of transmission further depends on a time duration of transmission by hierarchically preceding subscribers.

13. The method according to claim 11, wherein said point in time for commencement of transmission is determined relative to a cyclical initialization signal.

\* \* \* \* \*